(12) United States Patent
Heusel et al.

(10) Patent No.: US 12,212,195 B2
(45) Date of Patent: Jan. 28, 2025

(54) SYSTEM HOUSING FOR A DRIVE SYSTEM

(71) Applicant: Robert Bosch GmbH, Stuttgart (DE)

(72) Inventors: Timo Heusel, Gerlingen (DE); Carsten Dietz, Holzgerlingen (DE); Janek Kraeuter, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 17/908,893

(22) PCT Filed: Feb. 4, 2021

(86) PCT No.: PCT/EP2021/052632
§ 371 (c)(1),
(2) Date: Sep. 1, 2022

(87) PCT Pub. No.: WO2021/175535
PCT Pub. Date: Sep. 10, 2021

(65) Prior Publication Data
US 2023/0092040 A1 Mar. 23, 2023

(30) Foreign Application Priority Data
Mar. 4, 2020 (DE) ...................... 10 2020 202 749.8

(51) Int. Cl.
*H02K 11/33* (2016.01)
*B60K 1/00* (2006.01)
(Continued)

(52) U.S. Cl.
CPC ............... *H02K 11/33* (2016.01); *B60K 1/00* (2013.01); *B60K 17/12* (2013.01); *H02K 5/06* (2013.01);
(Continued)

(58) Field of Classification Search
CPC .... B60K 1/00; B60K 17/12; B60K 2001/006; H02K 9/197
See application file for complete search history.

(56) References Cited

U.S. PATENT DOCUMENTS

2018/0320985 A1* 11/2018 Salim Shirazy .... F28D 15/0233

FOREIGN PATENT DOCUMENTS

| CN | 102483309 A | 5/2012 |
| CN | 108882573 A | 11/2018 |

(Continued)

OTHER PUBLICATIONS

CN-109378945-A_translate (Year: 2019).*

(Continued)

*Primary Examiner* — Tulsidas C Patel
*Assistant Examiner* — Mohammed Ahmed Qureshi
(74) *Attorney, Agent, or Firm* — Michael Best & Friedrich LLP

(57) ABSTRACT

The invention relates to a housing (1), in particular for an electric drive system for a vehicle, wherein the housing (1) is configured as a system housing and is provided for receiving a plurality of system components, and wherein the housing (1) has a housing wall (11) which is produced by way of a casting mould, and a plurality of interfaces for connecting the housing (1) to components which are situated outside or inside the housing (1) are provided in or on the housing wall (11). Furthermore, the invention relates to the use of a housing (1) as a system housing for an electric drive axle of a motor vehicle.

14 Claims, 1 Drawing Sheet

(51) Int. Cl.
*B60K 17/12* (2006.01)
*H02K 5/06* (2006.01)
*H02K 5/20* (2006.01)
*H02K 5/22* (2006.01)
*H02K 7/116* (2006.01)
*H02K 9/197* (2006.01)

(52) U.S. Cl.
CPC ............... *H02K 5/203* (2021.01); *H02K 5/22* (2013.01); *H02K 7/116* (2013.01); *H02K 9/197* (2013.01); *B60K 2001/006* (2013.01)

(56) References Cited

FOREIGN PATENT DOCUMENTS

| | | | | |
|---|---|---|---|---|
| CN | 109378945 A | * | 2/2019 | ............ H02K 11/33 |
| DE | 102010008584 A1 | | 8/2011 | |
| DE | 102012016208 A1 | | 2/2014 | |
| DE | 102013217890 A1 | | 3/2015 | |
| DE | 102013021745 A1 | | 6/2015 | |
| WO | WO-2018087477 A1 | * | 5/2018 | ............... H02K 5/20 |
| WO | 2019154154 A1 | | 8/2019 | |

OTHER PUBLICATIONS

WO-2018087477-A1_translate (Year: 2018).*
Translation of International Search Report for Application No. PCT/EP2021/052632 dated Apr. 22, 2021 (2 pages).

* cited by examiner

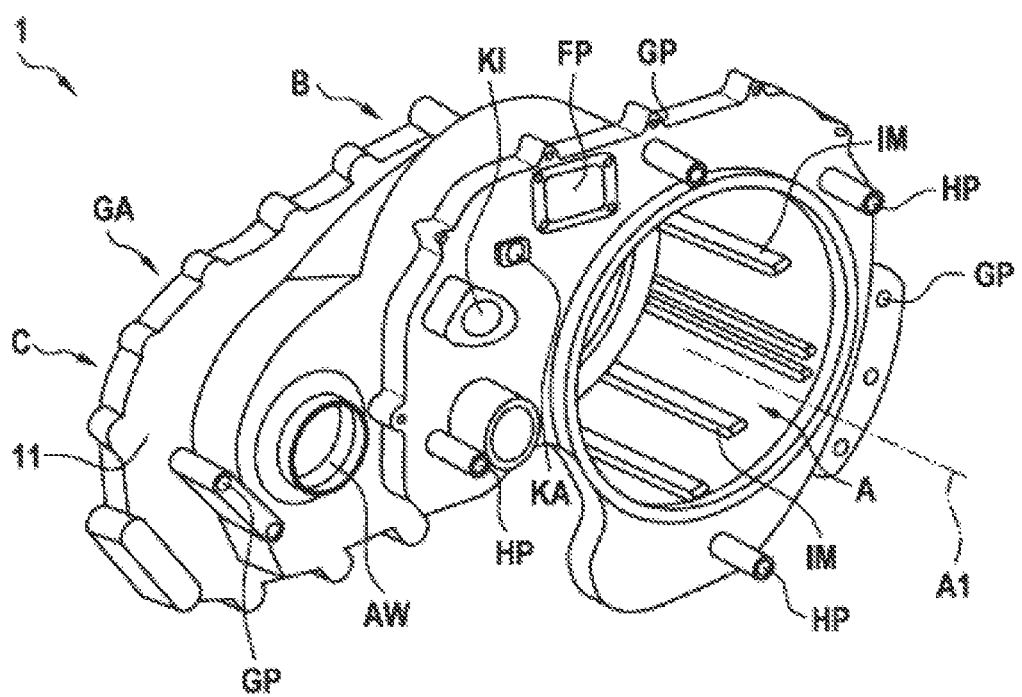

SYSTEM HOUSING FOR A DRIVE SYSTEM

FIELD OF THE INVENTION

The invention relates to a housing, in particular for an electric drive system for a vehicle, wherein the housing is configured as a system housing and is provided to receive multiple system components, and wherein the housing has a housing wall produced using a casting mold and multiple interfaces for connecting the housing to components located outside or within the housing are provided in or on the housing wall. The invention further relates to the use of a housing as the system housing for an electric drive axle of a motor vehicle.

BACKGROUND

Various system components, such as the drive itself or motor, one or more transmissions and the associated control and feedback control systems, must be housed in a protected fashion in a housing. One possibility for providing housing of this kind is modular housings which consist of multiple individual components, where each individual component receives a system component. The disadvantage of modular housings of this kind is that the connection of the individual components is complex. Moreover, the transfer of heat between the individual components is prevented by separation points, which prevents a transfer of heat from one system component to another or the removal of heat by a cooling system. A further possibility for housing different system components is so-called system housings, which include multiple system components. The transfer of heat between the individual regions of a system housing is substantially better than in modular housings. However, in the case of system housings which are known in the art, there is still a large amount of work involved in installing the system components in the housing and also connecting the system housing to other components arranged outside.

DE 10 2013 021 745 A1 describes a converter motor which has a stator housing. The converter motor has a cooling channel with two connections for a coolant. The stator housing also has a plate-shaped portion for supporting a converter, wherein said plate-shaped portion is configured integrally with the stator housing, preferably as a casting.

DE 10 2013 217 890 A1 discloses an electric machine housing with a first housing part for receiving an electric machine stator and a second housing part for receiving a power electronics module. The first housing part comprises further portions, such as a portion for receiving a transmission, for example. A cooling channel with two connections is provided for the electric machine, wherein said cooling channel runs in the first housing part. The first housing part and the second housing part preferably form an integral housing.

DE 10 2012 016 208 A1 relates to a housing having a cooling jacket for an electric motor. The housing in this case comprises a cooling channel with two connections for conveying a coolant. The housing further comprises portions for receiving power electronics and a transmission.

SUMMARY

A housing, in particular for an electric drive system for a vehicle, is proposed, wherein the housing is configured as a system housing and provided to receive multiple system components. The housing has a housing wall produced using a casting mold, wherein multiple interfaces for connecting the housing to components located outside or inside the housing are provided in, or on, the housing wall. The interfaces comprise at least one coolant inlet and/or coolant outlet, at least one housing fastening point for fastening the housing to other components, in particular for fastening the housing to the vehicle, at least one inner jacket connection for fastening an inner jacket inside the housing, at least one transmission covering connection for fastening a transmission cover, and at least one electronics covering connection for fastening a cover for power electronics. A housing according to the invention is configured as a system housing and is particularly suitable for receiving multiple system components of an electric drive system for vehicles, also referred to as an E-axle. A housing according to the invention may, however, also be used in other technical fields in which multiple system components are arranged adjacent to one another, for example in the field of machine tools. A housing according to the invention has a housing wall which is produced in by casting. The housing wall in this case is typically made of metallic materials, for example of iron base alloys or aluminum base alloys. Production by casting allows complex geometries of the housing wall to be mass-produced cost-effectively. Following production by casting, regions of the housing wall can be optionally reworked using different production methods, for example by milling, boring, grinding, or the like. A plurality of interfaces for connecting the housing to components located outside or inside the housing is provided in, or on, the housing wall. At least one coolant inlet and/or coolant outlet is provided, in order to allow a simple connection of a cooling system to the system housing. Coolant is required in order to cool one or multiple system components arranged in the housing. A coolant inlet or coolant outlet is usually formed by an opening in the housing wall which may, in addition, be provided with a flange or a thread. Moreover, the coolant inlet or coolant outlet may have one or multiple regions for receiving a seal. Furthermore, at least one housing fastening point for fastening the housing to other components is provided as the interface. One or multiple housing fastening points of this kind are used to fasten the housing to the vehicle or to another higher-level assembly. A housing fastening point of this kind may be configured by a stop surface combined with a receiving means for a connection element, such as a screw, for example. Alternatively, a housing fastening point may also be configured as a plug-in connection or snap-fit connection. A housing fastening point is generally used for fastening, positioning and fixing the housing to other subassemblies. Furthermore, at least one inner jacket connection is provided for fastening an inner jacket inside the housing. An inner jacket in this case should be understood to mean a component arranged parallel to the housing wall, at least in sections, which component is fastened in the inside of the housing. Following the attachment of an inner jacket of this kind, a chamber is created between the housing wall and said inner jacket, which can be used as a channel for coolant. By attaching an inner jacket, a two-part housing wall is created. In this way, coolant channels which, if incorporated in a one-piece housing wall would involve hard-to-produce undercuts, are easily realized by fitting the inner jacket on top. An inner jacket of this kind may be produced from a metal material by flow-pressing, for example. Alternatively, an inner jacket can be formed by one or multiple sheets or by one or multiple plastics parts. The inner jacket connection represents an interface for fastening an inner jacket. The inner jacket connection in this case may be configured as a stop surface, for example, but also as a form-fitting interface, for example in the form of a plug-in receiving means. Further alternatively, the inner jacket connection may be realized as an adhesive or weld contact surface for attachment of the inner jacket. Moreover, a housing according to the invention has as the interface at least one transmission covering connection for fastening a transmission cover. A system housing according to the invention is usually provided for receiving a transmission, among other things. In order to cover the transmission, a transmission cover is needed, which is connected to the housing by means of at least one transmission covering connection. The transmission covering connection is realized as a flat connection surface, for example, in the vicinity of which receiving regions for connection elements, such as screws, for example, are arranged. The transmission covering connection may also have one or multiple receiving means for sealing elements. The transmission covering connection may surround or enclose a relatively large opening in the housing wall, through which at least part of the transmission can be introduced into the system housing. Finally, a housing according to the invention comprises as the interface at least one electronics covering connection for fastening a cover for power electronics. Power electronics are usually housed separately from other system components. In order to introduce power electronics into the housing, an opening is provided which must be sealed by an electronics cover before it goes into operation. An electronics cover of this kind may be configured as a cover, for example. The electronics covering connection is the interface by which the electronics cover is connected. The electronics covering connection may be realized similarly to the transmission covering connection.

In one embodiment it is provided that the interfaces furthermore comprise at least one base for fastening an element to the housing and/or a housing characteristic for a park lock system and/or for an uncoupling element and/or at least one assembly interface and/or at least one plug fastening point for fastening an electrical connector to the housing and at least one screw-on point for an intermediate shaft. A housing may, in addition, have one or more of the previously mentioned interfaces. In this case, the different interfaces can be freely combined with one another. A further optional interface of this kind is a base for fastening an element to the housing. An element to be attached to a base of this kind may be a sensor, such as a temperature sensor, for example. The base allows the simple attachment of an element of this kind, without further intermediate components being necessary. Furthermore, the housing may have as the interface a housing characteristic for a park lock system and/or for an uncoupling element. A housing characteristic in this case should be understood to mean a region of the housing wall oriented towards the outside, in which system components can be arranged. A housing characteristic therefore makes additional internal volume available in the housing. A park lock system may be arranged within a housing characteristic, for example. A park lock system of this kind is a lock for the transmission which is activated as a soon as the vehicle which is fitted with a drive system is parked. The transmission is disabled by this lock and the vehicle cannot roll away. Alternatively, an uncoupling element can be arranged in a housing characteristic. An uncoupling element of this kind may temporarily disconnect the drive, for example an electric machine, from the transmission, in order to allow overrunning, for example. An uncoupling element of this kind may also be referred to as a disconnect. Furthermore, a housing may have at least one assembly interface as the interface. Assemblies which do not belong directly to the drive system, such as an air-conditioning compressor, for example, may be arranged as part of a vehicle's air-conditioning system on an assembly interface. The provision of one or more assembly interfaces of this kind means that further connection elements for the attachment of these assemblies are spared. Furthermore, or alternatively, a housing may have as the interface a plug-in fastening point for fastening an electrical connector to the housing. A plug-in fastening point of this kind is used for the fixed arrangement of electrical connection elements which are needed for the wiring of the different system components in the system housing to one another, for example. By means of a plug-in fastening point, electrical components can be fastened simply, and without the need for additional receiving means, straight onto or into the housing wall. As a further interface, at least one screw-on point for an intermediate shaft can be provided. An intermediate shaft is used for deflecting torque from the system housing to a transmission arranged outside, such as a differential transmission of an additional axle, for example. A screw-on point of this kind usually comprises an opening for the intermediate shaft to pass through, and a fastening region to which a cover or casing of the intermediate shaft can be fastened to the system housing in a sealed manner. Further interfaces for the arrangement of further components can of course be provided on a housing on the housing wall.

In a further embodiment, it is provided that the interfaces are adapted in their nature and position, on or in the housing, to the requirements of the user of the housing. The interfaces are used to connect the housing to other components. In order to allow optimal integration of the housing in other assemblies, in particular in a vehicle, the interfaces are adapted to the requirements of the user of the housing, which result from the other components of the higher-level assemblies. If the user would like to arrange the housing in a vehicle which has an air-conditioning system and a park brake, for example, the corresponding interfaces, in the aforementioned example an assembly interface for an air-conditioning compressor and a housing characteristic for a park lock system, are arranged at places which allow optimal interaction with other components of the vehicle.

It is furthermore provided that the housing, in particular the housing wall, has at least one handling point which is provided as a gripping point when working the housing and/or during the assembly of system components in the housing, wherein the handling point is arranged at a position in the housing which remains unchanged when the interfaces are adjusted in terms of their nature and position on or in the housing, according to the requirements of the user of the housing. At least one handling point is arranged on the housing in this embodiment. This handling point is used as the gripping point at which the housing or the housing wall is gripped during assembly. The handling point may be gripped and received by a grappler of a robot, for example, during automatic assembly of the housing. A handling point of this kind may have a cylindrical lateral surface or one or more planar key surfaces for good force and torque transmission during assembly. Optionally, a handling point may have visually contrasting regions which make the handling point easier to detect by a camera during automatic processing. A handling point may be designed as a simple cylindrical pin, for example, which has an indentation on its end face that contrasts visually with the remaining surface of the pin. In order to make the production and processing of a housing easier, the position of the handling point is selected in such a manner that this position remains constant, even when there are changes in the nature and location of the interfaces. One or multiple handling points which are always arranged spatially in the same position enable a single casting mold to be used for the production of different kinds of housings. In order to adjust the nature and position of the interfaces, only corresponding inserts have to be changed on this casting mold, whereas the regions of the mold for production of the handling points can remain unchanged. This means that the mold costs during adjustment of a housing are substantially reduced. Furthermore, a constant positioning of the handling points brings with it the advantage that existing assembly facilities, such as assembly lines, do not have to be changed in relation to the handling of the housing. The constant arrangement of the handling points means that the same gripping tools can be used while performing the same, or very similar, movements, something that reduces the cost of assembling the housing substantially.

In a further embodiment it is provided that the housing wall has a two-part or multi-part design. In the simplest embodiment, the housing wall has an integral design, which means that it is produced as a single part with the help of a casting mold. With more complex designs or larger housings, the housing wall may also have a two-part or multi-part design. The individual parts are then produced separately in one or various casting molds. Later on, the parts of the housing wall can be joined together side by side to produce a single-layer housing wall. Alternatively, a two-layer or multi-layer housing wall in which the parts of the housing wall run parallel to one another, at least in sections, can also be formed from the parts.

It is furthermore provided that the housing has multiple housing chambers which are provided to receive different system components, for example an electric machine, a transmission and power electronics. In this embodiment, the inside of the housing is divided into multiple housing chambers. These housing chambers are provided to receive different system components. The housing chambers are separated from one another, at least sectionally. Transitions or passages can be provided between the housing chambers, so that connections, such as control lines, can be conducted from one housing chamber to the next, for example. Individual or multiple housing chambers can also be sealed in relation to the other housing chambers, however. A housing chamber sealed in this manner is suitable for receiving a transmission, for example, which is lubricated by a liquid lubricant. The seal prevents the lubricant from penetrating the other housing chambers in this case. Multiple housing chambers can be realized when the housing is produced by a single casting mold.

It is provided in one embodiment that the housing wall is made of a heat-conductive material, as a result of which an unimpeded heat transfer between multiple housing chambers is guaranteed. Metallic materials have particularly good thermal conductivity. In practice, aluminum-based materials have proved suitable materials for the housing wall, since they provide good thermal conductivity and high mechanical strength.

In a further embodiment, it is provided that a first housing chamber for receiving an electric machine is provided, which housing chamber runs in an axial direction which is parallel to the rotor shaft of the electric machine to be received by the housing chamber, and a further housing chamber is provided for receiving power electronics, wherein the further housing chamber is arranged in the axial direction of the first housing chamber. In this embodiment, a housing chamber for receiving an electric machine is provided, wherein this housing chamber exhibits a shape which is adapted to the electric machine. The electric machine has a rotor with a rotor shaft. The direction in which the rotational axis of the rotor shaft runs when the electric machine is installed, or a direction oriented parallel thereto, is referred to as the axial direction of the housing chamber. A further housing chamber for receiving the power electronics is arranged in this axial direction to the housing chamber which receives the electric machine. An arrangement of this kind may also be referred to as the axial attachment of the housing chamber for the power electronics to the housing chamber of the electric machine.

In an alternative embodiment, it is provided that a housing chamber is provided for receiving an electric machine, which housing chamber has a lateral surface which is spaced apart and runs about the rotor shaft of the electric machine being received by the housing chamber and a further housing chamber is provided for receiving power electronics, wherein the housing chamber is arranged on the lateral surface of the housing chamber. In this alternative to the previously described embodiment, a further housing chamber is provided which is arranged on the lateral surface of a first housing chamber, wherein the first housing chamber is provided for receiving the electric machine and the other housing chamber is provided for receiving the power electronics. The surface which is arranged radially about the rotor shaft, about the rotor and about the stator, is referred to as the lateral surface of the housing chamber for the electric machine. The lateral surface is a different surface to the axially arranged end surfaces. An arrangement of a housing chamber on the lateral surface of a housing chamber which is provided for the electric machine may also be referred to as a jacket attachment. The arrangement of different chambers in the housing relative to one another may be individually adapted to the specific use of the housing. Further housing chambers for further system components can of course be provided in addition to the two housing chambers previously described.

Furthermore, the use of a housing according to one of the previously described embodiments as the system housing for an electric drive axle of a motor vehicle is proposed. The housing is particularly suitable for receiving system components which belong to an electric drive axle of a motor vehicle. System components of this kind are, for example, the drive, which is formed by an electric machine, at least one transmission, and at least one power electronics assembly. The use of a housing in the electric drive technology is particularly favorable, since in the case of electric drive technology, reliable solutions are required through a simple system configuration. Moreover, waste heat from many system components created in the electric drive technology must be able to be reliably discharged, for which purpose the housing which is described is particularly suitable due to its very good thermal conductivity.

In one embodiment of the use it is provided that the electric drive axle is part of the drive of a hybrid vehicle or of a pure electric vehicle. The use of a housing according to one of the previously described embodiments is particularly advantageous to the arrangement of the electric drive axle in a hybrid vehicle. A hybrid vehicle has multiple drive components which have to be combined and synchronized with one another, for which purpose a plurality of interfaces of the components between one another is required. A housing according to one of the previously described embodiments is optimally adaptable to the requirements in a hybrid vehicle on account of its plurality of different interfaces. A housing can of course also be used in an exclusively electrically driven vehicle.

In the case of a housing according to the invention, many functions are bundled together in a single system housing. In the optimum case, all required interfaces are provided on the housing wall for assembly both of the system components located in the housing and also for assembly of the housing on the vehicle or another higher-level assembly. A transmission according to the invention can then be mounted with a very little effort and without the need for complex connection elements. By varying the nature and position of the interfaces, the housing can be adapted to different applications. A casting mold is provided for production, which mold has flexible inserts for formation of the different interfaces. All that is then required in order for the housing to be adapted to different requirements is for these flexible inserts to be exchanged, which substantially reduces the tool costs during the production of differently designed housings.

BRIEF DESCRIPTION OF THE DRAWINGS

An embodiment of the invention is explained in greater detail with the help of the drawing and the following description.

In the drawing:

FIG. 1 shows a schematic, perspective view of a housing according to an embodiment of the invention.

DETAILED DESCRIPTION

In the following description of embodiments of the invention, the same or similar elements are denoted using the same reference sign, wherein a repeated description of these elements is dispensed with in individual cases. The figures are only a schematic representation of the subject matter of the invention.

FIG. 1 shows a schematic, perspective view of a housing 1 according to an embodiment of the invention. The housing 1 is depicted schematically without system components assembled therein or thereon. The housing 1 is based on a one-piece housing wall 11 which has been produced by casting. The housing wall 11 was reworked, for example in the region of some interfaces, by milling, boring and grinding. The housing 1 shown comprises three housing chambers A, B, C. Facing front right is the housing chamber A which is provided to receive an electric machine. The axial direction A1 of the housing chamber A is symbolized by a dotted line. A further housing chamber B is arranged behind the housing chamber A in the axial direction A1, which housing chamber is concealed by other parts of the housing 1 in the view in FIG. 1. The housing chamber B is provided for receiving power electronics. In the embodiment shown, an axial attachment of the power electronics to the electric machine is therefore realized. On the side facing the left in the view, a further housing chamber C is arranged, which is likewise concealed by the housing wall 11. The housing chamber C is provided for receiving a transmission. The housing chambers A, B, C are separated from one another at least in part by partition walls. The housing 1, or else the housing wall 11, has different interfaces for connecting to components located outside or within the housing 1. By way of example, three housing fastening points GP are drawn in, which are provided for the connection of the housing 1 to a higher-level assembly, for example a vehicle. The drawn-in housing fastening points GP are arranged on the right and on the upper edge and also on the side of the housing wall 11 facing front left in the depiction. All housing fastening points GP in this case comprise a planar stop surface and receiving openings for fastening elements such as screws, for example. Further housing fastening points GP can of course be provided on the housing 1. In the upper region, roughly in the center of the depiction, a coolant inlet KI and a coolant outlet KA can be seen arranged next to one another. These two interfaces are provided to introduce and remove coolant for cooling system components located in the housing 1. Coolant inlet KI and coolant outlet KA each have receiving means for sealing elements in this case, which are configured as an inside bevel. A base FP for fastening an element to the housing 1 is arranged on the upper edge adjacent to the coolant outlet KA. This base FP is an interface which is produced by milling in the housing wall 11. A sensor can be arranged and fastened to the base FP, for example, which sensor determines the temperature of the housing 1. Further bases FP can be provided at other points of the housing 1 for the attachment of further elements. Arranged in the inside of the housing chamber A are multiple inner jacket connections IM. These inner jacket connections IM are designed as fins projecting into the inside, which ribs have radially inwardly pointing, planar bearing surfaces. The inner jacket connections IM are provided for the attachment of an inner jacket inside the housing chamber A. An inner jacket of this kind may be configured as a hollow cylinder, for example, the outer surface of which is connected to the inner jacket connections IM by means of an adhesive connection. Following assembly of an inner jacket of this kind, a cavity is created between the inner jacket and the inner wall of the housing chamber A, which cavity can be used for coolant to flow through. In this way, a cooling jacket can easily be created in the wall of the housing chamber A provided for receiving an electric machine. A transmission covering connection GA is arranged facing back left, concealed by the housing wall 11, rotating around the housing chamber C. This transmission covering connection GA represents an interface for connecting the housing 1 to a transmission covering, for example a transmission cover. In the embodiment shown, the transmission covering connection GA is realized as a planar surface which encloses the housing chamber C. In this case, the transmission covering connection GA has threaded bores at regular intervals, into which screws for fastening the transmission cover can be inserted. A screw-on point AW for an intermediate shaft is furthermore arranged on the side of the housing 1 facing front left. This interface allows an intermediate shaft to pass through outwardly from the transmission arranged in housing chamber C. The screw-on point AW comprises a cylindrical through-hole through the housing wall 11 and a fastening flange which runs around the cylindrical through-hole. The housing 1 furthermore comprises multiple handling points HP in the embodiment shown, which handling points are configured as cylindrical pins in this case, which project beyond the housing wall 11. All handling points HP shown face front right in the depiction. On each end face of the handling points HP is arranged a blind hole bore which contrasts visually with the end face. The handling points HP are provided as gripping areas, at which the housing 1 can be gripped during the assembly of system components or fixed to the vehicle. The shape of the handling points HP allows easy gripping by automated assembly devices which have correspondingly shaped grapplers. The visual contrast between the blind hole bore and the remaining end face of the handling points HP means that these can also be easily identified automatically by a camera, which is advantageous where there is fully automated assembly of the housing 1.

The invention is not limited to the exemplary embodiments described here and the aspects highlighted herein. Rather, a large number of modifications is possible within the scope indicated by the claims, these modifications falling within the knowhow of the person skilled in the art.

The invention claimed is:

1. A housing (1),
wherein the housing (1) is configured as a system housing with a plurality of housing chambers (A, B, C) and is provided to receive multiple system components;
wherein the housing (1) has a housing wall (11) produced using a casting mold;
wherein multiple interfaces for connecting the housing (1) to components located outside or within the housing (1) are provided in or on the housing wall (11);
wherein the multiple interfaces comprise
at least one coolant inlet and/or coolant outlet (KI, KA),
at least one housing fastening point (GP) for fastening the housing (1) to other components,
at least one inner jacket connection (IM) for fastening an inner jacket inside the housing (1), the inner jacket configured as a hollow cylinder, an outer surface of which is connected to the at least one inner jacket connection (IM), whereby a cavity between the inner jacket and an inner wall of a first housing chamber (A) of the plurality of housing chambers (A, B, C) can be used for a flow of coolant,
at least one transmission covering connection (GA) for fastening a transmission cover, and
at least one electronics covering connection for fastening a cover for power electronics,
wherein the at least one inner jacket connection (IM) includes ribs or fins extending in an axial direction (A1).

2. The housing (1) as claimed in claim 1, wherein the multiple interfaces furthermore comprise at least one base (FP) for fastening an element to the housing (1) and/or a housing characteristic for a park lock system and/or for an uncoupling element and/or at least one assembly interface and/or at least one plug fastening point for fastening an electrical connector to the housing (1) and at least one screw-on point (AW) for an intermediate shaft.

3. The housing (1) as claimed in claim 1, wherein the multiple interfaces are adapted in their nature and position, on or in the housing (1), to the requirements of the user of the housing (1).

4. The housing (1) as claimed in claim 1, wherein the housing (1) has at least one handling point (HP) which is provided as a gripping point when working the housing (1) and/or during assembly of system components in the housing (1), wherein the at least one handling point (HP) is arranged at a position in the housing (1) which remains unchanged when the multiple interfaces are adjusted in terms of their nature and position on or in the housing (1), according to the requirements of the user of the housing (1).

5. The housing (1) as claimed in claim 1, wherein the housing wall (11) has a two-part or multi-part design.

6. The housing (1) as claimed in claim 1, wherein the plurality of housing chambers (A, B, C) are provided to receive different system components, the plurality of housing chambers (A, B, C) including a first housing chamber (A), a second housing chamber (B), and a third housing chamber (C).

7. The housing (1) as claimed in claim 6, wherein the housing wall is made of a heat-conductive material, as a result of which an unimpeded heat transfer between the plurality of housing chambers (A, B, C) is guaranteed.

8. The housing (1) as claimed in claim 6, wherein the first housing chamber (A) is configured to receive an electric machine is provided, which first housing chamber runs in the axial direction (A1), and the second housing chamber (B) is provided for receiving power electronics, wherein the second housing chamber (B) is arranged in the axial direction (A1) of the first housing chamber (A).

9. The housing (1) as claimed in claim 6, wherein the first housing chamber (A) is provided for receiving an electric machine, which first housing chamber (A) has a lateral surface that is spaced apart and runs about a rotor shaft of the electric machine being received by the first housing chamber (A) and the second housing chamber (B) is provided for receiving power electronics, wherein the second housing chamber (B) is arranged on the lateral surface of the first housing chamber (A).

10. A system housing for an electric drive axle of a motor vehicle, the system housing comprising the housing (1) as claimed in claim 1.

11. The system housing for an electric drive axle of a motor vehicle as claimed in claim 9, wherein the electric drive axle is part of a drive of a hybrid vehicle or of a pure electric vehicle.

12. The housing (1) as claimed in claim 1, wherein the housing is part of an electric drive system for a vehicle.

13. The housing (1) as claimed in claim 4, wherein the at least one handling point (HP) is in the housing wall (11).

14. The housing (1) as claimed in claim 6, wherein the plurality of housing chambers (A, B, C) receive an electric machine, a transmission and power electronics.

* * * * *